US009865444B2

(12) United States Patent
Okumura

(10) Patent No.: US 9,865,444 B2
(45) Date of Patent: Jan. 9, 2018

(54) TIME-OF-FLIGHT MASS SPECTROMETER

(71) Applicant: SHIMADZU CORPORATION, Kyoto-shi, Kyoto (JP)

(72) Inventor: Daisuke Okumura, Mishima-gun (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 15/504,877

(22) PCT Filed: Aug. 19, 2015

(86) PCT No.: PCT/JP2015/073248
§ 371 (c)(1),
(2) Date: Feb. 17, 2017

(87) PCT Pub. No.: WO2016/027833
PCT Pub. Date: Feb. 25, 2016

(65) Prior Publication Data

US 2017/0271140 A1 Sep. 21, 2017

(30) Foreign Application Priority Data

Aug. 19, 2014 (WO) .................. PCT/JP2014/071603

(51) Int. Cl.
*H01J 49/40* (2006.01)
*H01J 49/16* (2006.01)
(Continued)

(52) U.S. Cl.
CPC .......... *H01J 49/401* (2013.01); *H01J 49/062* (2013.01); *H01J 49/24* (2013.01)

(58) Field of Classification Search
USPC ................ 250/281, 283, 286, 287, 288, 292
See application file for complete search history.

(56) References Cited

U.S. PATENT DOCUMENTS 5,142,332 A * 8/1992 Osawa ............... G03G 15/0849 399/44
6,040,575 A * 3/2000 Whitehouse ........... B82Y 15/00 250/282

(Continued)

FOREIGN PATENT DOCUMENTS

CA 2 318 586 A1 7/1999
CA 2 255 122 A1 6/2000

(Continued)

OTHER PUBLICATIONS

International Search Report for PCT/JP2015/073248, dated Nov. 2, 2015.

(Continued)

*Primary Examiner* — Bernard Souw
(74) *Attorney, Agent, or Firm* — Sughrue Mion, PLLC

(57) ABSTRACT

Ions ejected substantially simultaneously from a collision cell after being temporarily held inside the collision cell arrive at an orthogonal acceleration unit through an ion transport optical system. When the ions enter the orthogonal acceleration unit, voltages having a predetermined potential difference are applied to an entrance-side electrode and an exit-side auxiliary electrode, and as a result an electric field having a rising potential gradient along an axis is created in the orthogonal acceleration unit. As ions having low an m/z values and entering the orthogonal acceleration unit first is significantly decelerate, the packet of ions spread in the X-axis direction in accordance with the m/z values are compressed in the X-axis direction after entering the orthogonal acceleration unit. Thus, a mass-to-charge ratio range of ions that are accelerated in the orthogonal acceleration unit is broadened, and a mass spectrum of a broad range of mass-to-charge ratios can be obtained.

8 Claims, 4 Drawing Sheets

(51) Int. Cl.

| | |
|---|---|
| ***H01J 49/26*** | (2006.01) |
| ***B01D 59/44*** | (2006.01) |
| ***H01J 49/06*** | (2006.01) |
| ***H01J 49/24*** | (2006.01) |

(56) References Cited

U.S. PATENT DOCUMENTS

| | | | | |
|---|---|---|---|---|
| 6,204,500 | B1 * | 3/2001 | Whitehouse | B82Y 15/00 250/282 |
| 6,285,027 | B1 * | 9/2001 | Chernushevich | H01J 49/004 250/287 |
| 6,600,155 | B1 | 7/2003 | Andrien, Jr. et al. | |
| 2002/0030159 | A1 * | 3/2002 | Chernushevich | H01J 49/004 250/287 |
| 2003/0222214 | A1 | 12/2003 | Baba et al. | |
| 2004/0232327 | A1 | 11/2004 | Bateman et al. | |
| 2006/0289741 | A1 | 12/2006 | Li | |
| 2007/0176090 | A1 * | 8/2007 | Verentchikov | H01J 49/401 250/287 |
| 2009/0121123 | A1 * | 5/2009 | Giles | H01J 49/4235 250/282 |
| 2012/0138788 | A1 | 6/2012 | Taniguchi | |
| 2012/0199734 | A1 | 8/2012 | Giles et al. | |
| 2017/0236701 | A1 * | 8/2017 | Okumura | H01J 49/401 250/287 |
| 2017/0271140 | A1 | 9/2017 | Okumura | |

FOREIGN PATENT DOCUMENTS

| | | | |
|---|---|---|---|
| CA | 2 349 416 | A1 | 11/2002 |
| CA | 2 606 701 | A | 12/2006 |
| CA | 2 624 926 | A | 4/2007 |
| CN | 101366097 | A | 2/2009 |
| EP | 1 006 559 | A2 | 6/2000 |
| EP | 1949410 | A | 7/2001 |
| EP | 1886336 | | 2/2008 |
| EP | 1050065 | A | 11/2008 |
| GB | 2 429 330 | A | 2/2007 |
| JP | 2000-340169 | A | 12/2000 |
| JP | 2002-502086 | A | 1/2002 |
| JP | 2002-184349 | A | 6/2002 |
| JP | 2003-123685 | A | 4/2003 |
| JP | 2005-183022 | A | 7/2005 |
| JP | 2008-546147 | A | 12/2008 |
| JP | 2009-512162 | A | 3/2009 |
| JP | 2010-170848 | A | 8/2010 |
| JP | 5142332 | B | 2/2013 |
| JP | 5340735 | B2 | 11/2013 |
| WO | 99/38194 | A1 | 7/1999 |
| WO | 2006/129106 | A2 | 12/2006 |
| WO | 2007/044696 | A1 | 4/2007 |

OTHER PUBLICATIONS

Written Opinion for PCT/JP2015/073248 dated Nov. 2, 2015. [PCT/ISA/237].

Communication dated Jul. 25, 2017, from Japanese Patent Office in counterpart application No. 2016-543505.

Communication dated Jul. 25, 2017, from Japanese Patent Office in counterpart application No. 2016-544232.

Communication dated Nov. 14, 2017 from the United States Patent and Trademark Office in U.S. Appl. No. 15/504,541.

* cited by examiner

Fig. 3A
Fig. 3B
Fig. 3C
Fig. 3D
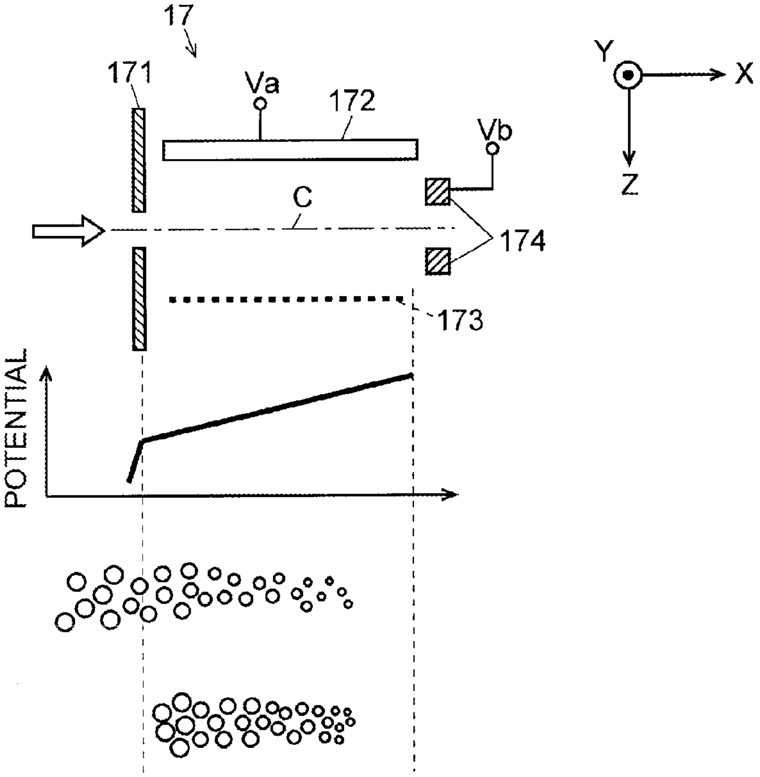
Fig. 4
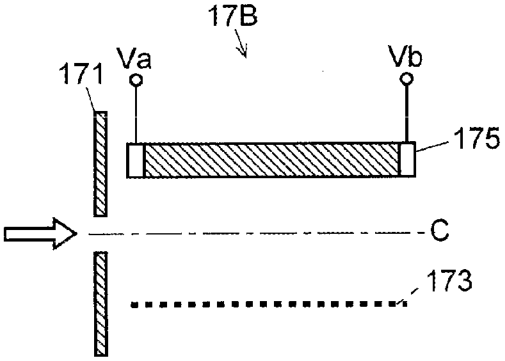
Fig. 5
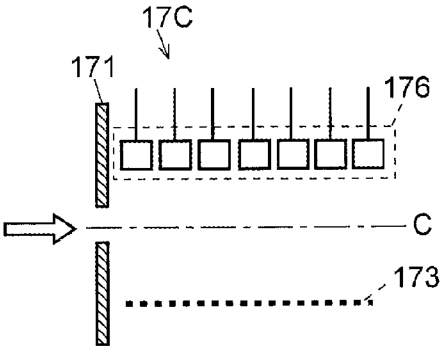

TIME-OF-FLIGHT MASS SPECTROMETER

CROSS REFERENCE TO RELATED APPLICATIONS

This is a National Stage of International Application No. PCT/JP2015/073248 filed Aug. 19, 2015, claiming priority based on International Application No. PCT/JP2014/071603 filed Aug. 19, 2014, the contents of all of which are incorporated herein by reference in their entirety.

TECHNICAL FIELD

The present invention relates to a time-of-flight mass spectrometer (hereunder, abbreviated as "TOFMS"), and more specifically to an orthogonal acceleration TOFMS and an ion-trap TOFMS which temporarily holds ions in an ion trap and ejects ions from the ion trap to send the ions to a flight space.

BACKGROUND ART

Generally, in a TOFMS, a preset amount of kinetic energy is given to ions originating from sample components to make the ions fly over a preset length of space. The period of time required for the flight is measured for each ion, and the mass-to-charge ratio of each ion is determined from the time of flight of that ion. Therefore, if, when the ions are accelerated and caused to start flying, there exist variations among ions with regard to position or amount of initial energy, there arise variations among the time of flight of ions having the same mass-to-charge ratio, which causes a decrease in the mass resolution or mass accuracy. One commonly known solution to this problem is an orthogonal acceleration TOFMS (which may also be called a "vertical acceleration TOFMS" or "orthogonal extraction TOFMS"), in which ions are accelerated and sent into flight space in a direction orthogonal to an incident direction of an ion beam.

Meanwhile, in recent years, in order to perform identification and structural analysis of a substance with a large molecular weight or a substance having a complex chemical structure, $MS^n$ analysis (which may also be called "tandem analysis") is being widely utilized in which ions having a specific mass-to-charge ratio are dissociated in one to a plurality of stages by a method such as collision-induced dissociation, and mass spectrometric analysis of the product ions generated thereby is performed. Well known mass spectrometers that can perform $MS^n$ analysis include: a triple quadrupole mass spectrometer in which a collision cell containing a quadrupole-type ion guide (or other multipole-type ion guide) for dissociating ions is sandwiched by quadrupole mass filters that are disposed at the front and rear of the collision cell; an ion-trap mass spectrometer that uses an ion trap which has both a function of separating ions according to mass-to-charge ratios and a function of performing a dissociation of ions; and an ion trap time-of-flight mass spectrometer in which the aforementioned kind of ion trap and a TOFMS are combined.

Further, a quadrupole-time-of-flight mass spectrometer (hereunder, referred to as "Q-TOFMS" in accordance with customary usage) is also known in which a quadrupole mass filter is disposed at the front of a collision cell and an orthogonal acceleration TOFMS is disposed at the rear of the collision cell in order to make use of the favorable performance of the aforementioned orthogonal acceleration TOFMS.

FIG. 6A is a schematic configuration diagram of a collision cell and an orthogonal acceleration unit in a Q-TOFMS described in Patent Literature 1. FIG. 6B is a view illustrating a potential distribution on an axis (in this case, an ion-optical axis) C in FIG. 6A. FIG. 6C is a timing chart of a voltage applied to an exit-side gate electrode and an orthogonal acceleration voltage illustrated in FIG. 6A.

As illustrated in FIG. 6A, in the Q-TOFMS, a linear ion trap (or ion guide) 51 is provided inside a collision cell 50 for dissociating ions, precursor ions having a specific mass-to-charge ratio selected with a quadrupole mass filter (not shown) are dissociated inside the collision cell 50, and resultant product ions (and precursor ions that were not dissociated) are temporarily held by the linear ion trap 51. Then, by temporarily lowering the voltage applied to an exit-side gate electrode 52 provided on the side of the collision cell 50, the ions are released from the linear ion trap 51 at a predetermined timing. The released ions are introduced along an X-axis direction into an orthogonal acceleration unit 55 of an orthogonal acceleration TOFMS via a grid electrode 53 and a skimmer 54, and when an acceleration voltage is applied to the orthogonal acceleration unit 55 at a predetermined timing, the ions are accelerated in a Z-axis direction and introduced into a flight space (not shown).

The solid line in FIG. 6B represents a potential distribution when ions are held in the linear ion trap 51. Since the potential of the exit-side gate electrode 52 is higher than that of the linear ion trap (rod electrode) 51, ions proceeding toward the exit-side gate electrode 52 are pushed back and contained inside the collision cell 50. The dashed line in FIG. 6B represents a potential distribution when the voltage applied to the exit-side gate electrode 52 is lowered. At this time, because the potential slopes downward from the exit-side end of the linear ion trap 51 toward the orthogonal acceleration unit 55, ions held in the linear ion trap 51 are accelerated toward the orthogonal acceleration unit 55.

Although ions having various mass-to-charge ratios that are held in the linear ion trap 51 are released almost simultaneously from the linear ion trap 51, there is a variation with respect to the ion travel direction (that is, the X-axis direction) until the ions reach the orthogonal acceleration unit 55. That is, because the acceleration energy imparted to each ion is substantially the same, the smaller the mass-to-charge ratio of an ion is, the higher the velocity of the ion is. Therefore, ions with a small mass-to-charge ratio travel ahead and arrive at the orthogonal acceleration unit 55 first, and ions with larger mass-to-charge ratios arrive at the orthogonal acceleration unit 55 with delays corresponding to the magnitude of the mass-to-charge ratio.

Because an acceleration voltage (a "push-pull voltage" in Patent Literature 1) is applied at a predetermined timing at the orthogonal acceleration unit 55, only ions that are passing through the orthogonal acceleration unit 55 during application of the acceleration voltage are accelerated toward the flight space, and the other ions are wasted. The utilization efficiency of the ions is called the "duty cycle", and is defined by the following equation (see Patent Literature 2 and other related literatures).

$$\text{Duty Cycle [\%]}=\{(\text{amount of ions utilized for measurement})/(\text{amount of ions that reach orthogonal acceleration unit})\}\times 100$$

Ions having various mass-to-charge ratios are generated as a result of dissociating ions inside the collision cell 50. The Q-TOFMS described in Patent Literature 1 improves the duty cycle with respect to ions having a mass-to-charge ratio of interest, a delay time $t_D$ from the time point $t_1$ of applying a pulse voltage for releasing ions from the linear ion trap 51 until the time point $t_2$ of applying an acceleration voltage in the orthogonal acceleration unit 55 is adjusted in accordance with the mass-to-charge ratio of the target ions (see FIG. 6C). Since, by this measures, an acceleration voltage is applied at a timing at which the ions of interest to the analyst pass through the orthogonal acceleration unit 55, the duty cycle for the ions of interest is improved and the detection sensitivity for the ions is enhanced. In this case, the duty cycle for ions other than the ions of interest to the analyst is low (or most of the ions are substantially not detected).

In a case where a mass-to-charge ratio of product ions to be observed is determined beforehand, MRM (multiple reaction ion monitoring) measurement or precursor ion scan measurement for example, the aforementioned Q-TOFMS is useful because the product ions can be detected with high sensitivity. However, when using the aforementioned Q-TOFMS, it is not possible to detect ions across an adequately wide mass-to-charge ratio range with high sensitivity, which is needed in the case of product ion scan measurement. That is, high duty cycle for ions cannot be achieved across a broad range of mass-to-charge ratios.

In addition to the aforementioned Q-TOFMS, a similar problem exists in the case of an ion trap TOFMS in which ions temporarily captured in a three-dimensional quadrupole ion trap are simultaneously ejected from the ion trap and subjected to mass spectrometry. In such a mass spectrometer, if ions arrive at an entrance of the ion trap in a wide spread group, among the ions that reach the ion trap, ions that may be captured inside the ion trap are the ions that arrive within a predetermined time range, and the other ions are reflected at the entrance or pass through the ion trap and are not utilized for measurement. Therefore, when ions arrive at the entrance of the ion trap at a variety of arriving time depending on the mass-to-charge ratios of the ions, only ions within a limited mass-to-charge ratio range are captured, and ions across a wide mass-to-charge ratio range cannot be measured with high sensitivity.

CITATION LIST

Patent Literature

[Patent Literature 1] U.S. Pat. No. 6,285,027
[Patent Literature 2] JP 2010-170848 A
[Patent Literature 3] JP 2002-184349 A

SUMMARY OF INVENTION

Technical Problem

The present invention has been developed to solve the previously described problem, and an object of the present invention is, in an orthogonal acceleration TOFMS or an ion-trap TOFMS, to measure ions across a wide mass-to-charge ratio range with high sensitivity by broadening a mass-to-charge ratio range of ions that are utilized in measurement with a TOFMS and suppressing the loss of the ions.

Solution to Problem

A first specific form of the present invention aimed at solving the previously described problem is an orthogonal acceleration time-of-flight mass spectrometer including an orthogonal acceleration unit for accelerating incident ions in a direction orthogonal to an incident axis of the ions, and a separation-detection unit for separating and detecting accelerated ions in accordance with mass-to-charge ratios, including:

a) an ion holding unit for temporarily holding ions that are a measurement object;

b) an ion transport optical system, arranged between the ion holding unit and the orthogonal acceleration unit, for guiding ions that are ejected from the ion holding unit to the orthogonal acceleration unit; and c) an ion travel adjusting unit for, at a time when ions enter the orthogonal acceleration unit from the ion transport optical system, creating an electric field having a rising potential gradient for the ions along an incident axis of the ions in a space of the orthogonal acceleration unit in which the ions are accelerated in an orthogonal direction.

A second specific form of the present invention aimed at solving the previously described problem is an orthogonal acceleration time-of-flight mass spectrometer including an orthogonal acceleration unit for accelerating incident ions in a direction orthogonal to an incident axis of the ions, and a separation-detection unit for separating and detecting accelerated ions in accordance with mass-to-charge ratios, including:

a) an ion holding unit for temporarily holding ions that are a measurement object;

b) an ion transport optical system, arranged between the ion holding unit and the orthogonal acceleration unit, for guiding ions that are ejected from the ion holding unit to the orthogonal acceleration unit; and c) a voltage application unit for, at a time of ejecting ions from the ion holding unit, applying a voltage to a constituent member included in each of the ion holding unit, the ion transport optical system and the orthogonal acceleration unit, so as to create an accelerating electric field that accelerates ions in a first region between an exit end of the ion holding unit and an entrance end of the ion transport optical system and to create, in a second region between an exit end of the ion transport optical system and an entrance end of the orthogonal acceleration unit, a decelerating electric field that decelerates ions and has a potential difference that is less than a potential difference in the first region.

A third specific form of the present invention aimed at solving the previously described problem is a time-of-flight mass spectrometer including an ion trap unit for, at a predetermined timing after capturing incident ions by an effect of an electric field, imparting acceleration energy to the ions to eject the ions substantially simultaneously, and a separation-detection unit for separating and detecting ions that are ejected from the ion trap unit in accordance with mass-to-charge ratios, including:

a) an ion holding unit for temporarily holding ions;

b) an ion transport optical system, arranged between the ion holding unit and the ion trap unit, for guiding ions that are ejected from the ion holding unit to the ion trap unit; and c) a voltage application unit for, at a time of ejecting ions from the ion holding unit, applying a voltage to a constituent member included in each of the ion holding unit, the ion transport optical system and the ion trap unit, so as to create an accelerating electric field that accelerates ions in a first region between an exit end of the ion holding unit and an entrance end of the ion transport optical system, and to create, in a second region between an exit end of the ion transport optical system and an entrance end of the ion trap unit, a decelerating electric field that decelerates ions and has a potential difference that is less than a potential difference in the first region.

In the time-of-flight mass spectrometer according to the first to third specific forms of the present invention, a configuration can be adopted in which the ion holding unit is a linear ion trap that is disposed inside a collision cell for dissociating ions.

A linear ion trap typically includes four cylindrical rod electrodes disposed in parallel to each other around a central axis, and an entrance-side gate electrode and an exit-side gate electrode disposed so as to be orthogonal to the central axis in a manner such that the four rod electrodes are sandwiched between them. A high-frequency voltage is applied to the four rod electrodes to form a high-frequency electric field that focuses ions in a space surrounded by the four rod electrodes, and a direct-current voltage of the same polarity as the ions is applied to the entrance-side gate electrode and the exit-side gate electrode to confine the ions between the two gate electrodes.

After ions are confined in the above manner, the ions that are being held can be ejected by lowering the voltage applied to the exit-side gate electrode to make the voltage lower than at least the direct-current potential of the rod electrodes. At such time, to ensure that the ions are ejected in a state in which the ions are gathered together as much as possible (that is, are in a packet shape), it is desirable that the ions are accumulated in the vicinity of the exit-side end of the rod electrodes during the time that the ions are being held. To gather ions in the vicinity of the exit-side end of the rod electrodes in this manner, for example, a potential gradient in the axial direction can be formed by utilizing a configuration disclosed in Patent Literature 3.

In the time-of-flight mass spectrometer according to the first specific form of the present invention, although ions being held in the ion holding unit are ejected substantially simultaneously, that is, in a packet shape, the ions may spread to some extent in the ion travel direction depending on the mass-to-charge ratios of the ions during a period until the ions reach the entrance of the orthogonal acceleration unit via the ion transport optical system. In this case, ions with a relatively small mass-to-charge ratio travel ahead and enter the orthogonal acceleration unit first, and ions with a relatively large mass-to-charge ratio enter the orthogonal acceleration unit later than the ions with smaller mass-to-charge ratios. At a time when the ions enter the orthogonal acceleration unit, an electric field which has a rising potential for the ions along the incident axis is created by an ion travel adjusting unit in a space of the orthogonal acceleration unit in which the ions are accelerated. Therefore, the ions that travel ahead and enter the orthogonal acceleration unit first must travel in the rising potential gradient and are thus decelerated. In this case, the earlier the ions enter the orthogonal acceleration unit, the greater the degree of deceleration is, and therefore after the ions that are spread in the ion travel direction have entered the orthogonal acceleration unit, the packet of ions is compressed in the travel direction of the ions. By accelerating the ions in a direction orthogonal to the incident axis of the ions in a state in which the ion packet is compressed in this way in the travel direction, ions having mass-to-charge ratios in a range wider than in the conventional technology can be accelerated and sent into a flight space.

In the time-of-flight mass spectrometer according to the first specific form of the present invention, a configuration can be adopted in which the aforementioned ion travel adjusting unit, for example, creates an electric field having a rising potential gradient for the ions along an incident axis of the ions by means of voltages applied to each of an electrode installed on an ion entrance side and an electrode installed at a frontward position in an ion travel direction along the incident axis in the orthogonal acceleration unit.

Preferably, the time-of-flight mass spectrometer according to the first specific form of the present invention further includes a voltage application unit for, at a time of ejecting ions from the ion holding unit, applying a voltage to a constituent member included in each of the ion holding unit, the ion transport optical system and the orthogonal acceleration unit, so as to create an accelerating electric field that accelerates ions in a first region between an exit end of the ion holding unit and an entrance end of the ion transport optical system and to create, in a second region between an exit end of the ion transport optical system and an entrance end of the orthogonal acceleration unit, a decelerating electric field that decelerates ions and has a potential difference that is less than a potential difference in the first region.

According to this configuration, when ejecting ions that are being held in the ion holding unit from the ion holding unit, an accelerating electric field is formed in the first region between the exit end of the ion holding unit and the entrance end of the ion transport optical system by applying a predetermined voltage to a constituent member of each of the ion holding unit and the ion transport optical system from the voltage application unit. Ions that are ejected from the ion holding unit are accelerated by the accelerating electric field and are introduced into the ion transport optical system. By making a potential difference in the accelerating electric field a large difference, a correspondingly large acceleration energy is imparted to the ions, and the velocity of the respective ions increases by a corresponding amount.

The velocity of ions when passing through the ion transport optical system depends on the mass-to-charge ratios of the ions, and a difference of time to reach a certain point, which is caused by differences between the mass-to-charge ratios, decreases as the aforementioned acceleration energy increases. Therefore, the potential difference in the accelerating electric field is made sufficiently large beforehand as described later. Because the time difference between the ions that is caused by differences between the mass-to-charge ratios is small, spreading of the positions of the ions in the ion travel direction that is caused by differences between the mass-to-charge ratios at a time point at which the ions pass through the ion transport optical system is small.

On the other hand, in the second region that is after the ions have passed through the ion transport optical system, the energy of the ions is decreased by a decelerating electric field. The respective ions are then introduced into the orthogonal acceleration unit in a state in which the energy of the ions has been decreased. As described above, ions that reach the decelerating electric field in a state in which the ions are not greatly spread in the ion travel direction are decelerated in the second region, and immediately thereafter enter the orthogonal acceleration unit. Therefore, spreading of the ions in the ion travel direction is suppressed to a large degree by decelerating the ions. Consequently, in a case where a delay time from a time point at which ions are ejected from the ion holding unit to a time point at which an acceleration voltage is applied in the orthogonal acceleration unit is made constant, ions across a broad range of mass-to-charge ratios can be accelerated and sent to flight space without wasting ions.

Further, if ions that are introduced into the orthogonal acceleration unit have excessively large energy, because the direction of acceleration caused by the acceleration voltage does not become a direction that is orthogonal to the incident axis and the ions instead fly out in an oblique direction, the flight distances deviate from an ideal state. Consequently, deviations also arise with respect to the times of flight, and the mass accuracy decreases. In this regard, according to the configuration described above, because the energy of the ions is decreased immediately before the ions enter the orthogonal acceleration unit, a deviation in the direction in which the ions fly out from the orthogonal acceleration unit is suppressed, and as a result a high mass accuracy can be ensured.

In the time-of-flight mass spectrometer according to the second specific form of the present invention, similarly to the preferable configuration of the time-of-flight mass spectrometer according to the first specific form described above, when ejecting ions that are being held in the ion holding unit from the ion holding unit, an accelerating electric field is formed in the first region between the exit end of the ion holding unit and the entrance end of the ion transport optical system by applying a predetermined voltage to a constituent member of each of the ion holding unit and the ion transport optical system from the voltage application unit. At such time, by making the potential difference in the accelerating electric field sufficiently large beforehand, the spread of the positions of the ions in the ion travel direction that is caused by differences between the mass-to-charge ratios at a time point at which the ions pass through the ion transport optical system can be made small.

On the other hand, in the second region that is after the ions have passed through the ion transport optical system, the energy of the ions is decreased by a decelerating electric field, and the respective ions are then introduced into the orthogonal acceleration unit in a state in which the energy of the ions has been decreased. As described above, ions that reach the decelerating electric field in a state in which the ions are not greatly spread in the ion travel direction are decelerated in the second region, and immediately thereafter enter the orthogonal acceleration unit. Therefore, by decelerating the ions, spreading of the ions in the ion travel direction can be suppressed to a level at which the spreading is substantially not a problem. As a result, the spread of the ions in the ion travel direction when passing through the orthogonal acceleration unit is less than in an apparatus described in Patent Literature 1, and in a case where a delay time from a time point at which ions are ejected from the ion holding unit to a time point at which an acceleration voltage is applied in the orthogonal acceleration unit is made constant, ions across a broad range of mass-to-charge ratios can be accelerated and sent to flight space without wasting ions.

Furthermore, in the time-of-flight mass spectrometer according to the third specific form of the present invention, as described above, ions that are decelerated in the second region enter the ion trap unit immediately after being decelerated. Since the spread of the ions in the ion travel direction at such time is small, ions across a broad range of mass-to-charge ratios can be captured in the ion trap unit without wasting ions. Further, if ions that are introduced into the ion trap unit have excessively large energy, the ions will pass through the ion trap unit without being captured even by a high-frequency electric field or will contact against an inner face of an electrode constituting the ion trap unit and disappear.

In this regard, in the time-of-flight mass spectrometer according to the third specific form, because the energy of ions is decreased immediately before the ions enter the ion trap unit, capturing of the ions by the ion trap unit is facilitated.

As described above, in a case where a linear ion trap disposed inside a collision cell is adopted as the ion holding unit, the degree of vacuum inside a vacuum chamber in which the collision cell is arranged is liable to decrease due to the influence of collision gas that is supplied to the collision cell from outside. Therefore, in the time-of-flight mass spectrometer according to the first or second specific form of the present invention, the ion holding unit, and the orthogonal acceleration unit and the separation-detection unit may be disposed in different vacuum chambers that are separated by a partition wall, and the ion transport optical system may be disposed so as to straddle both vacuum chambers and sandwich an ion passage opening provided in the partition wall.

In this configuration, the ion transport optical system may have a configuration in which, for example, electrode plates having a central aperture are arrayed along an ion-optical axis. In this case, by disposing the aforementioned electrode plates inside each of the two vacuum chambers to sandwich the ion passage opening provided in the partition wall, an ion transport optical system that straddles the two vacuum chambers can be realized.

Further, when adopting the foregoing configuration as an ion transport optical system, a predetermined voltage may be applied to each of the electrode plates to form an electric field that produces a lens effect that focuses ions that sequentially pass through the central apertures of the plurality of electrode plates. In this case, by adopting a configuration so that the average energy imparted to ions becomes almost zero as the entire ion transport optical system from an electrode plate at a first stage to an electrode plate at a final stage of the ion transport optical system, ions passing through this region are substantially not accelerated or decelerated.

In this configuration, the ion transport optical system may have a configuration in which, for example, electrode plates having a central aperture are arrayed along an ion-optical axis. In this case, by disposing the aforementioned electrode plates inside each of the two vacuum chambers to sandwich the ion passage opening provided in the partition wall, an ion transport optical system that straddles the two vacuum chambers can be realized.

Advantageous Effects of Invention

According to the time-of-flight mass spectrometers according to the first and second specific forms of the present invention, in comparison to the conventional apparatus, ions of a broader range of mass-to-charge ratios can be accelerated by an orthogonal acceleration unit and subjected to mass spectrometry without wasting ions. In other words, because a duty cycle for ions of a broad range of mass-to-charge ratios can be improved, a high-sensitivity mass spectrum can be obtained across a broad range of mass-to-charge ratios by a single measurement. In particular, by adopting a configuration which holds product ions produced by a collision-induced dissociation or the like in an ion holding unit, a favorable spectrum can be obtained in product ion scan measurement or neutral loss scan measurement.

Further, according to the time-of-flight mass spectrometer according to the third specific form of the present invention, ions having a broad range of mass-to-charge ratios can be captured in an ion trap unit and subjected to mass spectrometry without wasting ions. Therefore, similarly to the time-of-flight mass spectrometer according to the first and second specific forms of the present invention, a high-sensitivity mass spectrum can be obtained across a wide range of mass-to-charge ratios by a single measurement.

BRIEF DESCRIPTION OF DRAWINGS

FIG. 3A is a detailed configuration diagram of the orthogonal acceleration unit shown in FIG. 1, FIG. 3B is a schematic potential distribution chart on an axis C, and FIG. 3C and FIG. 3D are explanatory diagrams for describing the behavior of ions.

FIG. 4 is a detailed configuration diagram of an orthogonal acceleration unit of an orthogonal acceleration TOFMS as another embodiment of the present invention.

FIG. 5 is a detailed configuration diagram of an orthogonal acceleration unit of an orthogonal acceleration TOFMS as another embodiment of the present invention.

DESCRIPTION OF EMBODIMENTS

A Q-TOFMS as one embodiment of the present invention is hereinafter described with reference to the attached drawings.

Figure 1:
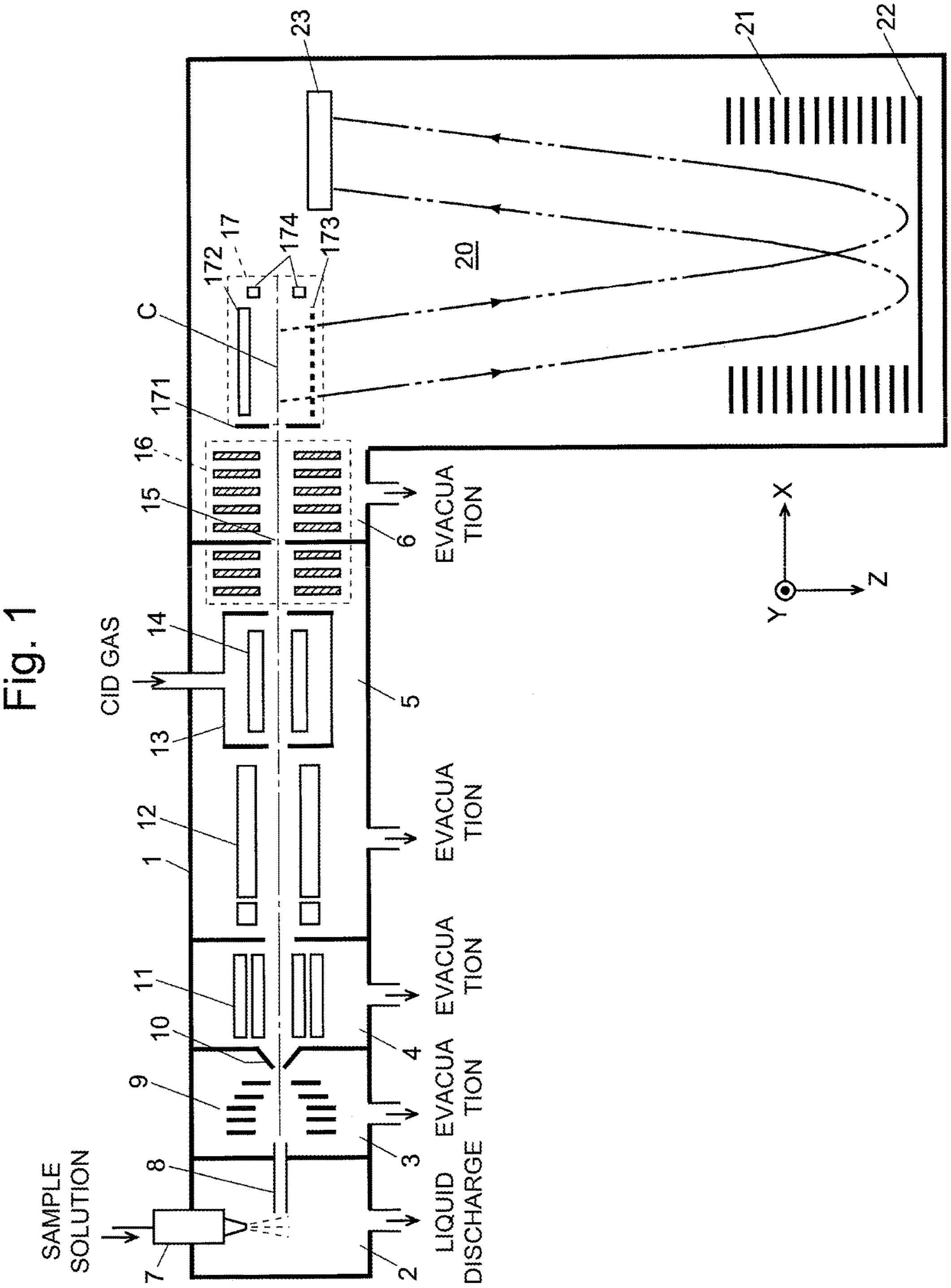
FIG. 1 is an overall configuration diagram of an orthogonal acceleration TOFMS as one embodiment of the present invention.

FIG. 1 is an overall configuration diagram of a Q-TOFMS of the present embodiment.

The Q-TOFMS of the present embodiment has a configuration of a multistage differential pumping system, in which, inside a chamber 1, three (first to third) intermediate vacuum chambers 3, 4 and 5 are arranged between an ionization chamber 2 at approximately atmospheric atmosphere and a high vacuum chamber 6 in which the degree of vacuum is highest.

An ESI spray 7 for performing electrospray ionization (ESI) is provided in the ionization chamber 2. When a sample solution containing a target compound is supplied to the ESI spray 7, biased electrical charges are imparted to the tip of the spray 7, and ions originating from the target compound are generated from sprayed droplets. The ionization method is not limited thereto and, for example, when the sample is a liquid, apart from ESI, an atmospheric pressure ionization method such as APCI or PESI can be used, when the sample is in a solid state, the MALDI method or the like can be used, and when the sample is in a gaseous state, the EI method or the like can be used.

The various kinds of ions that are generated are sent to the first intermediate vacuum chamber 3 through a heating capillary 8, are focused by an ion guide 9 and then sent to the second intermediate vacuum chamber 4 through a skimmer 10. Furthermore, the ions are focused by an octopole ion guide 11 and sent to the third intermediate vacuum chamber 5. A quadrupole mass filter 12 and a collision cell 13 inside which a quadrupole-type ion guide 14 functioning as a linear ion trap is provided are disposed inside the third intermediate vacuum chamber 5. Various kinds of ions originating from the sample are introduced to the quadrupole mass filter 12, and only ions having a specific mass-to-charge ratio in accordance with a voltage applied to the quadrupole mass filter 12 pass through the quadrupole mass filter 12. These ions are introduced into the collision cell 13 as precursor ions, and the precursor ions are dissociated inside the collision cell 13 by contact with a CID gas supplied from outside, and various kinds of product ions are generated.

The ion guide 14 functions as a linear ion trap, and the generated product ions are temporarily held therein. The ions that are being held are released from the collision cell 13 at a predetermined timing, and are introduced into the high vacuum chamber 6 through an ion passage opening 15 while being guided by an ion transport optical system 16. The ion transport optical system 16 is disposed straddling the third intermediate vacuum chamber 5 and the high vacuum chamber 6 in a condition in which the ion transport optical system 16 sandwiches the ion passage opening 15.

An orthogonal acceleration unit 17 that is an ion ejection source, a flight space 20 including a reflector 21 and a back plate 22, and an ion detector 23 are provided inside the high vacuum chamber 6. Ions that are introduced in the X-axis direction into the orthogonal acceleration unit 17 are accelerated in the Z-axis direction at a predetermined timing and thus brought into flight. The ions first fly freely, thereafter turn back due to a reflecting electric field that is formed by the reflector 21 and the back plate 22, and again fly freely to arrive at the ion detector 23. A time of flight from a time point at which the ions depart from the orthogonal acceleration unit 17 until the ions arrive at the ion detector 23 depends on the mass-to-charge ratios of the respective ions. Accordingly, a data processing unit (not shown) which receives detection signals from the ion detector 23 calculates mass-to-charge ratios based on the times of flight of the respective ions, and for example, creates a mass spectrum.

Figures 2A, 2B, 2C:
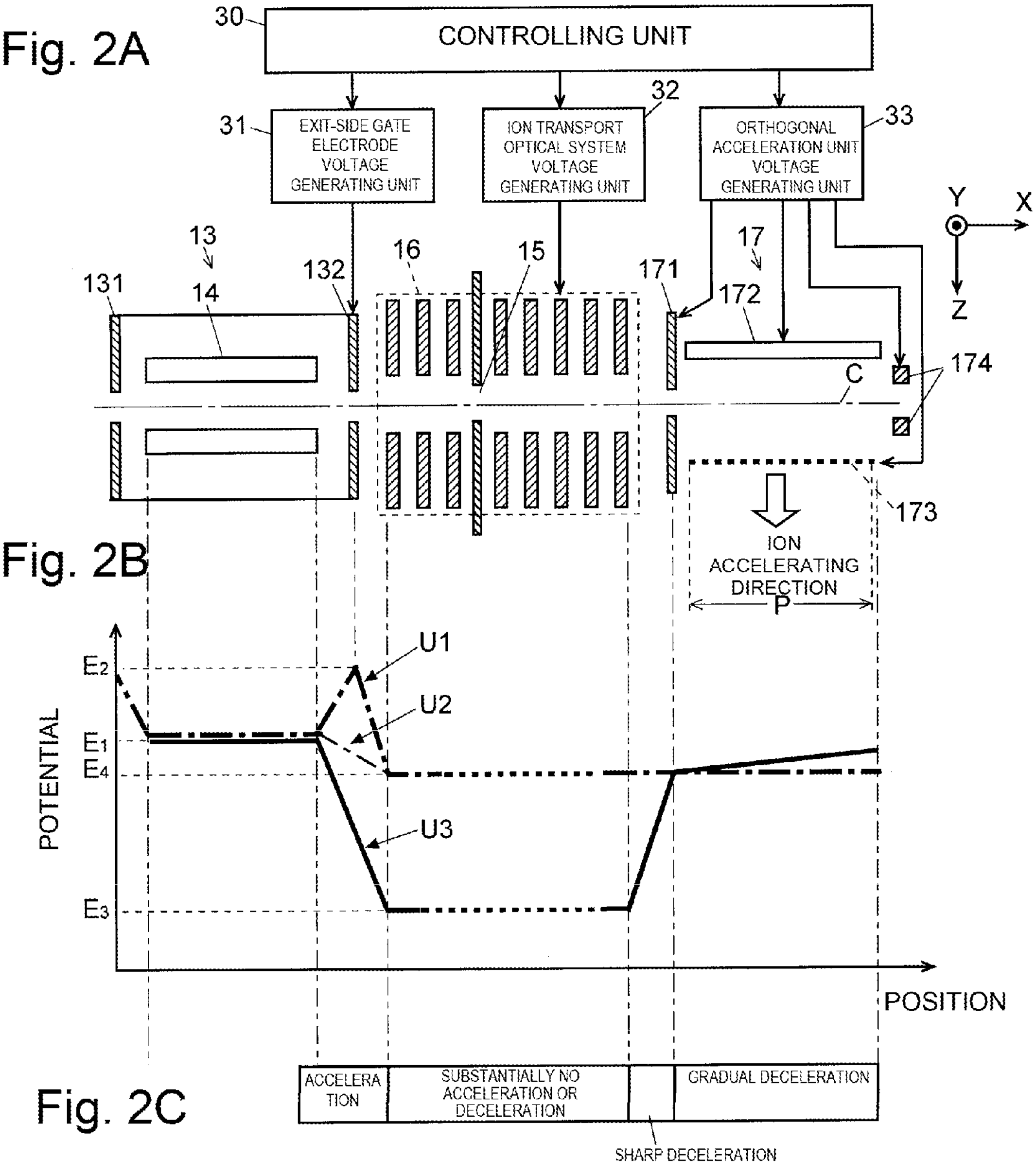
FIG. 2A, FIG. 2B and FIG. 2C are a detailed configuration diagram of a collision cell and an orthogonal acceleration unit shown in FIG. 1, a schematic potential distribution chart on an axis C, and a view illustrating the behavior of ions in a space between the collision cell and the orthogonal acceleration unit, respectively.

FIG. 2A shows a detailed configuration diagram of a space between the collision cell 13 and the orthogonal acceleration unit 17 shown in FIG. 1, FIG. 2B is a schematic potential distribution chart on an axis (in this case, an ion-optical axis) C, and FIG. 2C is a view illustrating the behavior of ions in the space between the collision cell 13 and the orthogonal acceleration unit 17. FIG. 3A is a detailed configuration diagram of the orthogonal acceleration unit shown in FIG. 1, FIG. 3B is a schematic potential distribution chart on an axis C, and FIG. 3C and FIG. 3D are explanatory diagrams for describing the behavior of ions in the orthogonal acceleration unit 17.

As shown in FIG. 2A, a front end face and a rear end face of the collision cell 13 have an entrance-side gate electrode 131 and an exit-side gate electrode 132, respectively. The entrance-side gate electrode 131 and exit-side gate electrode 132 and the ion guide 14 function substantially as a linear ion trap. The ion transport optical system 16 has a structure in which a number of (in this example, eight) disc-like electrode plates that each have a circular aperture at the center are arranged along the axis C. The orthogonal acceleration unit 17 includes an annular entrance-side electrode 171, a tabular push-out electrode 172, a grid-like pull-out electrode 173, and an annular exit-side auxiliary electrode 174.

Under control of a controlling unit 30, an exit-side gate electrode voltage generating unit 31 applies a predetermined voltage to the exit-side gate electrode 132, an ion transport optical system voltage generating unit 32 applies a predetermined voltage to each electrode plate included in the ion transport optical system 16, respectively, and an orthogonal acceleration unit voltage generating unit 33 applies a predetermined voltage to the entrance-side electrode 171, the push-out electrode 172, the pull-out electrode 173 and the exit-side auxiliary electrode 174, respectively.

Only components that are necessary for describing characteristic operations are illustrated in FIG. 2, and although not illustrated in the drawings, appropriate voltages are also applied to the ion guide 14 and the entrance-side gate electrode 131 and the like.

Figure 6A:
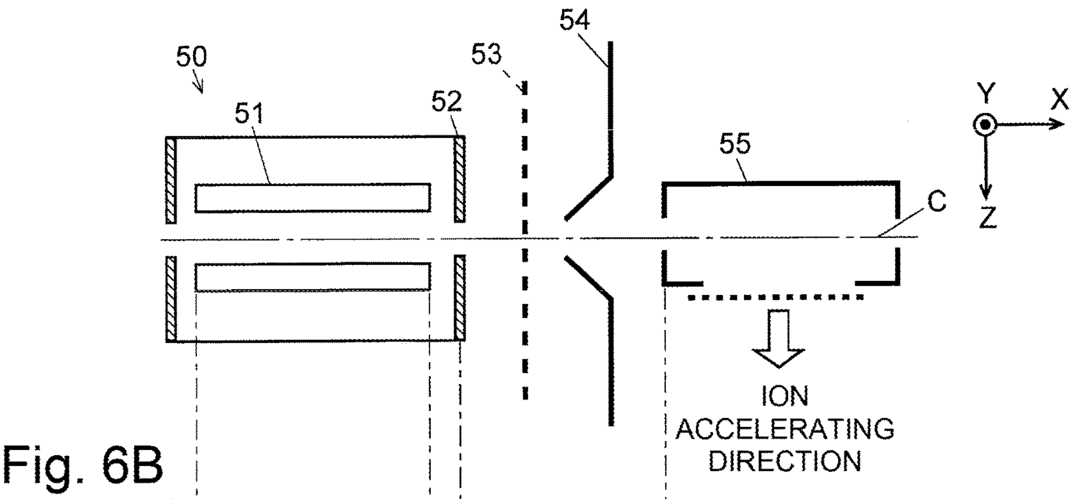
FIG. 6A, FIG. 6B, and FIG. 6C are a detailed configuration diagram of a collision cell and an orthogonal acceleration unit in a conventional Q-TOFMS, a potential distribution chart on an axis C, and a timing chart of an applied voltage to an exit-side gate electrode and an orthogonal acceleration voltage, respectively.
Figure 6B:
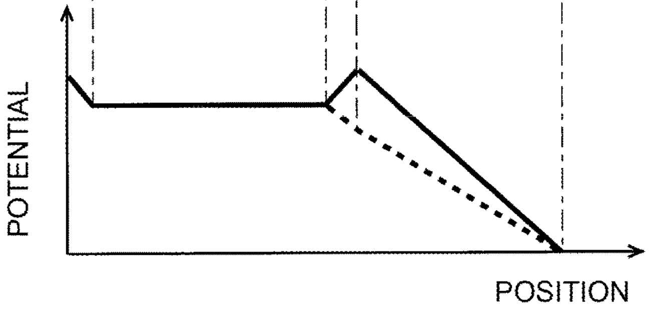
Figure 6C:
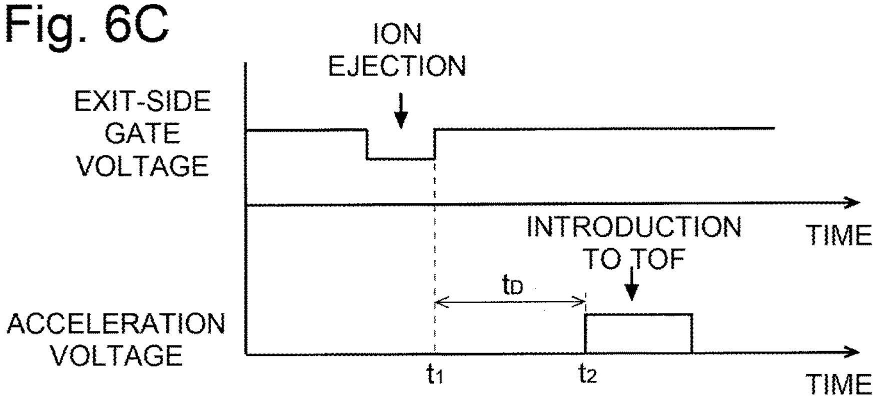

The alternate long and short dash line U1 shown in FIG. 2B represents a schematic potential distribution when ions are being held in the linear ion trap (inside the collision cell 13). At this time, the exit-side gate electrode voltage generating unit 31 applies a predetermined voltage to the exit-side gate electrode 132 that is higher than a predetermined voltage applied to the ion guide 14. By this means, as shown by the alternate long and short dash line U1 in FIG. 2B, the exit-side gate electrode 132 has a potential E2 that is higher than a potential E1 of the ion guide 14, and as a result ions are mainly held inside the ion guide 14. This situation is the same as in the case of the conventional apparatus that was described above using FIG. 6B.

In this state, by application of a voltage from the orthogonal acceleration unit voltage generating unit 33 to the entrance-side electrode 171, the entrance-side electrode 171 has a potential $E_4$ that is lower than the potential $E_1$ of the ion guide 14. Further, by application of a voltage to each electrode plate included in the ion transport optical system 16 from the ion transport optical system voltage generating unit 32, the average potential of the entire ion transport optical system 16 has the same potential as that of the entrance-side electrode 171. Although potentials at the installation locations of the respective electrode plates in the ion transport optical system 16 are not the same, the potential can be regarded as constant when considered on an average basis, and therefore in FIG. 2B the potential distribution is represented by a dashed line.

The solid line U3 illustrated in FIG. 2B represents a schematic potential distribution when ions that had been held in the linear ion trap are released. At this time, the exit-side gate electrode voltage generating unit 31 significantly reduces the voltage applied to the exit-side gate electrode 132. Further, the ion transport optical system voltage generating unit 32 significantly reduces the voltage applied to the respective electrode plates included in the ion transport optical system 16 by an amount that corresponds to the amount by which the voltage applied to the exit-side gate electrode 132 was reduced. However, a potential difference across the respective electrode plates constituting the ion transport optical system 16 is maintained so as to form an electric field exhibiting a lens effect which focuses ions that attempt to pass through the central apertures of the electrode plates. Therefore, although the potentials at the installation locations of the respective electrode plates in the ion transport optical system 16 are not the same, the potential can also be regarded as constant when considered on an average basis, and hence in FIG. 2B the potential distribution is represented by a dashed line.

By this means, the average potential of the overall ion transport optical system 16 becomes a potential $E_3$ that is far lower than the potential $E_4$ of the entrance-side electrode 171. A potential barrier at the exit-side gate electrode 132 also disappears. Then, an accelerating electric field that exhibits a potential gradient having a sharp downward slope is formed from an exit-side end of the ion guide 14 toward an entrance-side end face (first-stage electrode plate) of the ion transport optical system 16. The ions that had been held in the internal space of the internal space of the ion guide 14 until immediately prior thereto are accelerated by the accelerating electric field.

The thin alternate long and short dash line U2 shown in FIG. 2B represents a potential distribution during ion release based on the apparatus disclosed in Patent Literature 1. Although in this case also ions that have been held in the ion guide 14 are accelerated by an accelerating electric field, it can be seen that the slope of the potential gradient in the accelerating electric field is gentle, and the acceleration energy imparted to the ions is small. In the Q-TOFMS of the present embodiment, as shown in FIG. 2B, the slope of the potential gradient in the accelerating electric field is made large by making the difference large between the potential at the exit-side end of the ion guide 14 and the potential at the entrance-side end face of the ion transport optical system 16, and a large amount of acceleration energy is thus imparted to the respective ions that pass through the electric field. Since the amount of acceleration energy received by the respective ions is the same irrespective of the mass-to-charge ratios, each ion has a velocity depending on the mass-to-charge ratio of the ion.

When the amount of acceleration energy is large, the velocity of each ion increases by a corresponding amount, and the lamer that the velocity is overall, the more difficult it is for a time difference due to a velocity difference to arise when ions travel by a unit distance. In other words, the larger that the velocity is overall, the less likely it is for a distance difference to arise between ions with a small mass-to-charge ratio that have a comparatively high velocity and ions with a large mass-to-charge ratio that have a comparatively low velocity. Therefore, ions having different mass-to-charge ratios pass through the ion transport optical system 16 without large position differences depending on the mass-to-charge ratios, that is, without broadly spreading in the ion travel direction. As described above, in the ion transport optical system 16, by adjusting a voltage applied to each electrode plate, a lens effect for ions is produced. Therefore, ions efficiently pass though the ion transport optical system 16 without significantly spreading in the radial direction of the axis C.

The ion guide 14 has an internal space that is long in the axis C direction. If the positions of ions vary significantly in the axial direction when the ions are being held in the internal space of the ion guide 14, when the ions are released from the ion guide 14, spreading of ions is liable to occur in the axial direction due to differences in the time taken for the ions to arrive at the accelerating electric field. Therefore, when holding ions in the internal space of the ion guide 14 (or at least immediately prior to releasing the ions), it is preferable that the ions are gathered at a position close to the exit-side end of the ion guide 14. To achieve such a state, a potential gradient in the axial direction can be formed utilizing the configuration disclosed in Patent Literature 3.

As a result of the average potential of the entire ion transport optical system 16 being the potential $E_3$ that is lower than the potential $E_4$ of the entrance-side electrode 171, a decelerating electric field exhibiting a potential gradient with a sharp upward slope is formed between the exit-side end face (electrode plate at the final stage) of the ion transport optical system 16 and the entrance-side electrode 171. Accordingly, ions that pass through the ion transport optical system 16 enter the decelerating electric field and the energy of the ions decreases. In other words, according to the Q-TOFMS of the present embodiment, ions are accelerated in the accelerating electric field created between the exit-side end of the ion guide 14 and the entrance-side end face of the ion transport optical system 16, and thereafter the ions are decelerated in a decelerating electric field created between the exit-side end face of the ion transport optical system 16 and the entrance-side electrode 171. However, because the potential difference ($E_4-E_3$) in the decelerating electric field is smaller than the potential difference ($E_1-E_3$) in the accelerating electric field, ions that are decelerated in the decelerating electric field are introduced to the orthogonal acceleration unit 17 at an appropriate velocity. Although the spread of the ions in the ion travel direction is broadened due to deceleration, the ions enter the orthogonal acceleration unit 17 immediately after deceleration, and thus spreading of the ions in the X-axis direction in accordance with the mass-to-charge ratios of the ions is suppressed.

The orthogonal acceleration unit voltage generating unit 33 applies to the exit-side auxiliary electrode 174 a voltage Vb that is a little higher than a voltage Va that is applied to the entrance-side electrode 171 during a period until a predetermined delay time elapses from a time point at which the ions are released from the ion guide 14 upon lowering the voltage applied to the exit-side gate electrode 132 and the ion transport optical system 16 in a pulse form. At this time, a voltage need not be applied to the push-out electrode 172, or an appropriate voltage within the voltages Va and Vb may be applied to the push-out electrode 172. As a result, in the space between the entrance-side electrode 171 and the exit-side auxiliary electrode 174, a DC electric field having an upward potential gradient for the ions is created along the axis C as shown in FIG. 3B.

The ions that have passed through the entrance-side electrode 171 ascend and travel the upward gradient, which gently decelerates the ions. For the ions that have relatively small mass-to-charge ratios that enter first, the earlier that the ions enter, the greater the degree of deceleration is, while on the other hand the ions that have relatively large mass-to-charge ratios which enter with a delay are not decelerated very much. As a result, after the ions enter the orthogonal acceleration unit 17 while spreading in the X-axis direction (direction of the axis C) as illustrated in FIG. 3C, the packet of ion is compressed in the X-axis direction as illustrated in FIG. 3D. In other words, after entering the orthogonal acceleration unit 17, the spread of ions in the X-axis direction due to the mass-to-charge ratios is further reduced.

The orthogonal acceleration unit voltage generating unit 33 applies a predetermined acceleration voltage to each of the push-out electrode 172 and the pull-out electrode 173 at a timing after a predetermined delay time from a time point at which the ions are released from the ion guide 14 upon lowering the voltage applied to the exit-side gate electrode 132 and the ion transport optical system 16 in a pulse form. As a result, the ions that had been proceeding through the orthogonal acceleration unit 17 in the X-axis direction are accelerated in the Z-axis direction. At this time, ions existing in a predetermined length (a length P of the accelerating region in FIG. 2A) in the X-axis direction are accelerated. Because spreading of the ions in the X-axis direction due to the mass-to-charge ratios is suppressed as described above, it is possible to accelerate the ions at a time when ions of a broad range of mass-to-charge ratios are present in the aforementioned length P by appropriately setting the delay time. That is, ions having a broad range of mass-to-charge ratios can be sent into the flight space 20 without wasting ions, and a mass spectrum across a broad range of mass-to-charge ratios can be obtained.

Further, although each ion before deceleration has a large amount of energy, the energy of each ion significantly decreases through the decelerating electric field. If ions with a large amount of energy are introduced into the orthogonal acceleration unit 17, when the ions are accelerated in the Z-axis direction the ions will fly out while keeping a large velocity component in the X-axis direction, and hence the trajectory of the ions will significantly deviate from the Z-axis direction. In this regard, in the Q-TOFMS of the present embodiment, because ions enter the orthogonal acceleration unit 17 in a state in which the energy of each ion is sufficiently decreased, deviation of the trajectory of the ions from the Z-axis direction can be suppressed. As a result, changes in the flight distance are small, and the accuracy of the mass-to-charge ratios that are calculated based on the times of flight can be increased.

As described above, in the Q-TOFMS of the present embodiment, a mass spectrum (product ions spectrum) of a broad range of mass-to-charge ratios can be obtained with high sensitivity and high accuracy by a single measurement.

When the degree of spreading of ions in the ion travel direction depending on mass-to-charge ratios in introducing the ions into the orthogonal acceleration unit 17 is changed, the mass-to-charge ratio range of mass spectrum data obtained by a single measurement changes. The aforementioned degree of spreading of ions is mainly determined by the magnitude of acceleration energy imparted to the ions in the accelerating electric field (that is, the potential difference in the accelerating electric field), the length in the axis C direction of the ion transport optical system 16, the length P of the accelerating region in the orthogonal acceleration unit 17, and a difference between the applied voltage Va to the entrance-side electrode 171 and the applied voltage Vb to the exit-side auxiliary electrode 174 when ions enter the orthogonal acceleration unit 17 or the like. Therefore, a configuration may be adopted in which the relation between these factors is determined in advance and, for example, control such as adjusting the magnitude of the acceleration energy or the degree of deceleration in the orthogonal acceleration unit 17 in response to the desired mass-to-charge ratio range is performed.

A configuration other than the foregoing configuration can also be adopted to create an electric field having a rising potential gradient as described above when ions enter the orthogonal acceleration unit 17. FIG. 4 and FIG. 5 are views that illustrate such modifications.

FIG. 4 and FIG. 5 show modified configurations of the push-out electrodes for acceleration. In the example illustrated in FIG. 4, a push-out electrode 175 consists of a resistive element or is made by forming a resistive layer on the surface of a conductive material, and an electric field as described above is created by a difference between voltages applied to both ends thereof. When accelerating ions in the orthogonal direction, the same voltage may be applied to both ends of the push-out electrode 175. Meanwhile, in the example illustrated in FIG. 5, a push-out electrode 176 is forming by dividing an electrode into a plurality of electrodes and disposing the electrodes with predetermined intervals therebetween in the axis C direction. An electric field is created as described above by applying respectively different voltages (stepped voltages) to each of the divided electrodes. When accelerating ions in the orthogonal direction, the same voltage may be applied to all of the divided electrodes constituting the push-out electrode 176.

Although in the foregoing embodiment the present invention is applied to a Q-TOFMS that uses an orthogonal acceleration TOFMS, the present invention can also be applied to a linear TOFMS or a reflectron TOFMS that adopts a three-dimensional quadrupole ion trap as an ion ejection source. In such a case, the orthogonal acceleration unit 17 in the configuration of the foregoing embodiment may be replaced with a three-dimensional quadrupole ion trap. In other words, a configuration may be adopted in which ions that pass through the ion transport optical system 16 and travel through the decelerating electric field are introduced from an entrance of the three-dimensional quadrupole ion trap inside the pertinent ion trap. In this case, although it is necessary to limit a time period in which ions that travel through the entrance are introduced inside the three-dimensional quadrupole ion trap to a specific range, by using the configuration of the above embodiment it is possible to introduce ions of a broader range of mass-to-charge ratios into the ion trap. As a result, a mass-to-charge ratio range of a mass spectrum obtained by subjecting ions captured in the ion trap to mass spectrometry can be widened.

The previous embodiment is one example of the present invention, and any change, modification or addition appropriately made within the spirit of the present invention will naturally fall within the scope of claims of the present application.

REFERENCE SIGNS LIST

1 . . . Chamber
2 . . . Ionization Chamber
3, 4, 5 . . . Intermediate Vacuum Chamber
6 . . . High Vacuum Chamber
7 . . . ESI Spray
8 . . . Heating Capillary
9 . . . Ion Guide
10 . . . Skimmer
11 . . . Ion Guide
12 . . . Quadrupole Mass Filter
13 . . . Collision Cell
131 . . . Entrance-Side Gate Electrode
132 . . . Exit-Side Gate Electrode
14 . . . Ion Guide
15 . . . Ion Passage Opening
16 . . . Ion Transport Optical System
17 . . . Orthogonal Acceleration Unit
171 . . . Entrance-Side Electrode
172, 175, 176 . . . Push-Out Electrode
173 . . . Pull-Out Electrode
174 . . . Exit-side Auxiliary Electrode
20 . . . Flight Space
21 . . . Reflector
22 . . . Back Plate
23 . . . Ion Detector
30 . . . Controlling Unit
31 . . . Exit-Side Gate Electrode Voltage Generating Unit
32 . . . Ion Transport Optical System Voltage Generating Unit
33 . . . Orthogonal Acceleration Unit Voltage Generating Unit
C . . . Axis

The invention claimed is:

1. An orthogonal acceleration time-of-flight mass spectrometer including an orthogonal acceleration unit for accelerating incident ions in a direction orthogonal to an incident axis of the ions, and a separation-detection unit for separating and detecting accelerated ions in accordance with mass-to-charge ratios, comprising:

a) an ion holding unit for temporarily holding ions that are a measurement object;

b) an ion transport optical system, arranged between the ion holding unit and the orthogonal acceleration unit, for guiding ions that are ejected from the ion holding unit to the orthogonal acceleration unit;

c) an ion travel adjusting unit for, at a time when ions enter the orthogonal acceleration unit from the ion transport optical system, creating an electric field having a rising potential gradient for the ions along an incident axis of the ions in a space of the orthogonal acceleration unit in which the ions are accelerated in an orthogonal direction; and d) a voltage application unit for, at a time of ejecting ions from the ion holding unit, applying a voltage to a constituent member included in each of the ion holding unit, the ion transport optical system and the orthogonal acceleration unit, so as to create an accelerating electric field that accelerates ions in a first region between an exit end of the ion holding unit and an entrance end of the ion transport optical system and to create, in a second region between an exit end of the ion transport optical system and an entrance end of the orthogonal acceleration unit, a decelerating electric field that decelerates ions and has a potential difference that is less than a potential difference in the first region.

2. The time-of-flight mass spectrometer according to claim 1, wherein:

the ion travel adjusting unit creates the electric field having the rising potential gradient for ions along the incident axis of the ions by means of voltages applied to each of an electrode installed on an ion entrance side and an electrode installed at a frontward position in an ion travel direction along the incident axis in the orthogonal acceleration unit.

3. The time-of-flight mass spectrometer according to claim 1, wherein the ion holding unit is a linear ion trap that is disposed inside a collision cell for dissociating ions.

4. The time-of-flight mass spectrometer according to claim 1, wherein the ion holding unit, and the orthogonal acceleration unit and the separation-detection unit, are disposed in different vacuum chambers that are separated by a partition wall, and the ion transport optical system is disposed so as to straddle both vacuum chambers and sandwich an ion passage opening provided in the partition wall.

5. The time-of-flight mass spectrometer according to claim 2, wherein the ion holding unit is a linear ion trap that is disposed inside a collision cell for dissociating ions.

6. The time-of-flight mass spectrometer according to claim 2, wherein the ion holding unit, and the orthogonal acceleration unit and the separation-detection unit, are disposed in different vacuum chambers that are separated by a partition wall, and the ion transport optical system is disposed so as to straddle both vacuum chambers and sandwich an ion passage opening provided in the partition wall.

7. The time-of-flight mass spectrometer according to claim 3, wherein the ion holding unit, and the orthogonal acceleration unit and the separation-detection unit, are disposed in different vacuum chambers that are separated by a partition wall, and the ion transport optical system is disposed so as to straddle both vacuum chambers and sandwich an ion passage opening provided in the partition wall.

8. The time-of-flight mass spectrometer according to claim 5, wherein the ion holding unit, and the orthogonal acceleration unit and the separation-detection unit, are disposed in different vacuum chambers that are separated by a partition wall, and the ion transport optical system is disposed so as to straddle both vacuum chambers and sandwich an ion passage opening provided in the partition wall.

* * * * *